United States Patent
Ibaraki

(10) Patent No.: US 8,047,720 B2
(45) Date of Patent: Nov. 1, 2011

(54) BEARING DEVICE FOR MAIN ELECTRIC MOTOR FOR VEHICLE

(75) Inventor: Tamotsu Ibaraki, Yokohama (JP)

(73) Assignee: Toyo Electric Mfg. Co., Ltd., Tokyo (JP)

( * ) Notice: Subject to any disclaimer, the term of this patent is extended or adjusted under 35 U.S.C. 154(b) by 709 days.

(21) Appl. No.: 12/278,499

(22) PCT Filed: Feb. 21, 2007

(86) PCT No.: PCT/JP2007/053142
§ 371 (c)(1),
(2), (4) Date: Aug. 6, 2008

(87) PCT Pub. No.: WO2007/097351
PCT Pub. Date: Aug. 30, 2007

(65) Prior Publication Data
US 2009/0174269 A1 Jul. 9, 2009

(30) Foreign Application Priority Data
Feb. 22, 2006 (JP) .................................. P2006-44903

(51) Int. Cl.
*F16C 33/66* (2006.01)
(52) U.S. Cl. .......... 384/472; 384/473; 184/11.1; 310/90

(58) Field of Classification Search .................. 384/401, 384/403, 412, 462, 472, 473; 184/11.1, 11.2, 184/13.1; 310/90
See application file for complete search history.

(56) References Cited

U.S. PATENT DOCUMENTS

| | | | | | |
|---|---|---|---|---|---|
| 1,368,998 | A | * | 2/1921 | Barr | 384/139 |
| 2,010,896 | A | * | 8/1935 | Edward | 384/403 |
| 2,447,671 | A | * | 8/1948 | Schuck | 384/468 |
| 3,030,529 | A | * | 4/1962 | Jaeschke et al. | 310/53 |
| 3,796,283 | A | * | 3/1974 | Raby | 184/11.2 |
| 5,601,155 | A | * | 2/1997 | Gardner | 184/11.2 |

FOREIGN PATENT DOCUMENTS

| | | | |
|---|---|---|---|
| DE | 35 00 955 A1 | * | 7/1986 |
| JP | 10-178757 A | | 6/1998 |
| JP | 2003-23747 A | | 1/2003 |

* cited by examiner

*Primary Examiner* — William C Joyce
(74) *Attorney, Agent, or Firm* — Lucas & Mercanti, LLP

(57) ABSTRACT

Oil is supplied to bearing 1 and returned to oil storage chamber 6a via chamber 2a and pipe 2b. First oil return chamber 8 and second oil return chamber 7 communicate via a hole, and second oil return chamber 7 communicates with oil supply chamber 6 via oil return hole 9. The opening of the extension pipe 10 of oil return hole 9 has a small gap, to result in negative pressure in extension pipe 10. The negative pressure sucks the oil leaking from between bearing cover 3 and rotor shaft 20. The oil leaking is suppressed, keeping the supply of the lubricating oil to the bearing excellent.

4 Claims, 6 Drawing Sheets

BEARING DEVICE FOR MAIN ELECTRIC MOTOR FOR VEHICLE

TECHNICAL FIELD OF THE INVENTION

The present invention relates to a structure of a bearing device for electric motor for vehicle, and more particularly to a main electric motor for vehicle suppressed in leakage of lubricating oil to the outside of the device.

BACKGROUND OF THE INVENTION

Although grease is used in prior art for lubrication of a bearing of a main electric motor for vehicle, development and researches of bearing structures of oil lubrication have been advanced for the purpose of saving of maintenance because a cracking period is elongated. For bearing structures of oil lubrication in a main electric motor for vehicle there are known those listed in Japanese Unexamined Patent Application Publications No. 62-75195, No. 2003-23747 for example. In a bearing structure described in the '195 and '747 Applications, lubricating oil stored in an oil supply chamber is taken up by a rotation plate mounted on a rotary shaft and is supplied to a bearing box. In the prior art bearing device, a labyrinth structure seals between the oil supply chamber, the bearing box etc. and the outside of the structure to suppress the leakage of oil in the bearing device to the outside of the device.

However, such a constitution of sealing with the labyrinth structure as described above suffers from the leakage of oil to the outside of the device. More specifically, a pressure difference between the inside and outside of the main electric motor is increased owing to temperature rise in the main electric motor for vehicle upon the use of the same, a pressure change in the main electric motor by the rotation of a rotor, and changes in weather and dates upon the use of the main electric motor For this, oil taken up by the oil take-up disk becomes mist and might leak into or out of the device through clearance of the labyrinth.

Further, although it is necessary to effectively supply oil taken up to upper portion by the oil take-up disk, the device disclosed in the above '195 and '747 includes a passage etc. for supplying the lubricating oil taken up by the oil take-up disk to the bearing box. This complicates the structure and makes it difficult to effectively supply the lubricating oil depending on the shape and disposition of the passage.

OBJECT OF THE INVENTION

To solve the problem with the prior art it is an object of the present invention to provide a bearing device of a main electric motor for vehicle capable of suppressing the leakage of lubricating oil to the outside and of keeping the supply of lubricating oil to the bearing satisfactory.

SUMMARY OF THE INVENTION

The object is obtained by the bearing device of a main electric motor for vehicle of the present invention.

(1) Broadly, the present invention is designed as a bearing structure of a main electric motor for vehicle comprising: an oil take-up disk provided in an oil supply chamber having an oil sump at a lower side and rotating together with a rotor shaft, the oil take-up disk taking up lubricating oil stored in an oil sump to supply the lubricating oil into a bearing provided on a rotor shaft for lubrication of the bearing; an annular first oil return chamber provided on a bearing cover provided on an apparatus outside side surface for storing lubricating oil leaking through a gap between the bearing cover and the rotor shaft; an annular second oil return chamber provided on an outer periphery side of the first oil return chamber and communicated with the first oil return chamber via a hole communicated with the first oil return chamber.
the second oil return chamber and the oil supply chamber is communicated with each other. The invention further comprises a pipe extending to the oil return hole the pipe having openings facing the oil take-up disk provided in the oil sump with a fine gap in between so as to produce negative pressure in the pipe.

By providing the first oil return chamber and the second oil return chamber, as described above, the lubricating oil leaking through the gap between the bearing cover and the rotor shaft is first held in the first oil return chamber and is made to flow into the second oil return chamber via the communicating hole for storage therein.

By providing the extension pipe in the oil return hole for communicating the second oil return chamber and the oil supply chamber and making the openings of the pipe face each other with the fine gap formed through the oil take-up disk provided in the oil supply chamber, the extension pipe can suck into the oil storage chamber the lubricating oil stored in the second oil return chamber by making use of the negative pressure produced due to the rotation of the oil take-up disk.

It is therefore possible to effectively suppress the leakage of the lubricating oil to the outside of the device from the gap between the bearing cover and the rotor shaft.

(2) In the bearing structure of a main electric motor for vehicle according to (1) an oil thrower plate is disposed at upper portion of the oil take-up disk with a gap from the disk.

(3) In the bearing structure of a main electric motor for vehicle according to (1) or (2) an oil supply hole for guiding the lubricating oil taken up by the oil take-up disk in a bearing direction is provided on an upper side of an annular bearing press provided between the oil supply chamber and the bearing.

Effect of the Invention

In accordance with the present invention the following effect can be expected;

(1) the annular first oil return chamber and the annular second oil return chamber are provided on the bearing cover, the second oil return chamber and the oil supply chamber are communicated with each other through the oil return hole, the pipe extending to the oil return hole is provided, the opening of the pipe being made to face the oil take-up disk provided in the oil return chamber with the fine gap, so that it is possible in the main electric motor for vehicle including the bearing device of the oil lubricating structure to prevent the leakage of the oil in the bearing device to the outside and keep lubrication performance of the bearing excellent. It is therefore possible for the present invention to contribute to the reduction of the deterioration of a bearing and lubricating oil and the reduction of maintenance work of the main electric motor for vehicle.

(2) The oil thrower plate is provided at a location above the oil take-up disk separated with a fine gap from the disk, so that it is possible to bank up oil taken up just above the rotor shaft for ease of inflow thereof.

(3) The oil supply hole is provided above the annular bearing press provided between the oil supply chamber and the bearing for guiding the lubricating oil taken up with the oil take-up disk in the direction of the bearing, so that it is possible to guide the oil stored around the outer circumference of the bearing press through the bearing box into the bearing and make the lubrication state of the bearing excellent.

BRIEF DESCRIPTION OF THE DRAWINGS

These and other aspects of the present invention may be more fully understood by reference to one or more of the following drawings.

DESCRIPTION OF REFERENCE SYMBOLS

Figure 1:
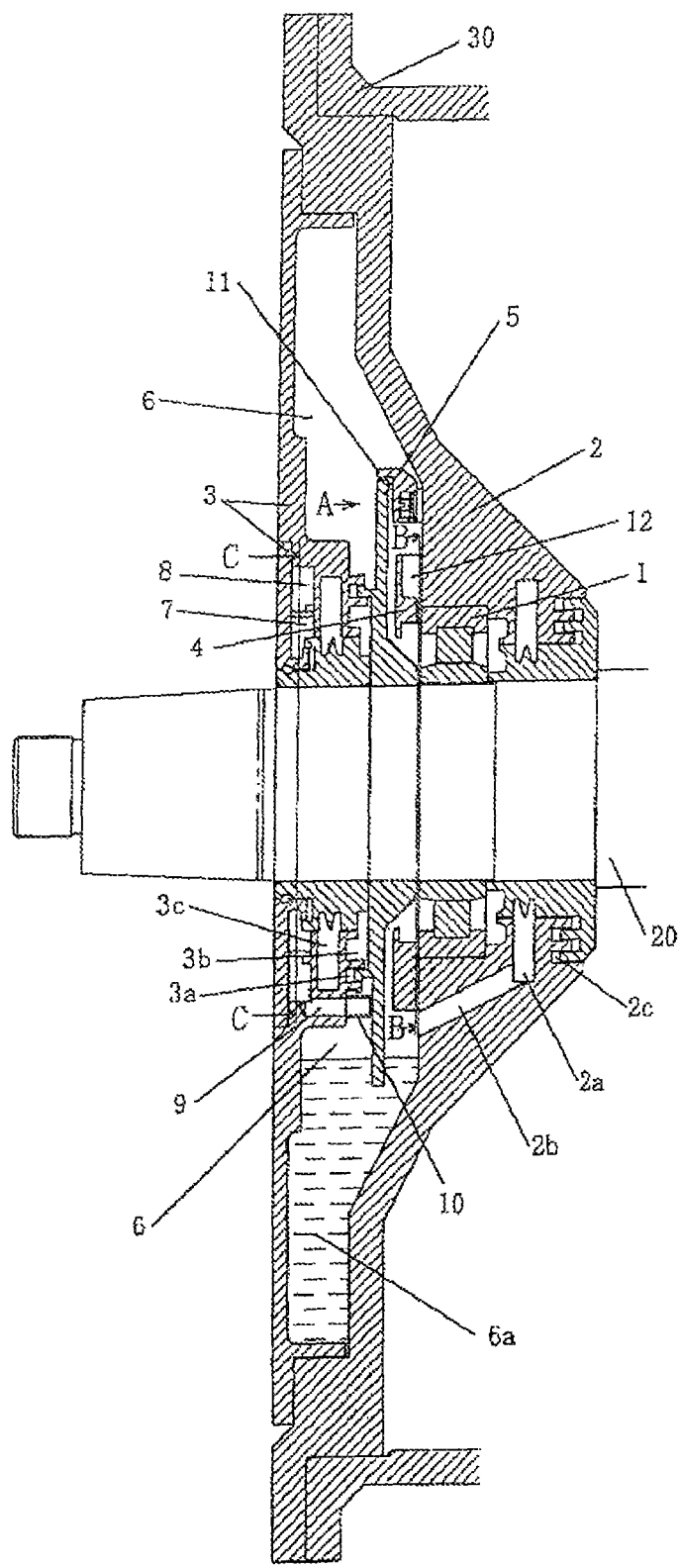
FIG. 1 is a view illustrating an embodiment of the present invention.

1: bearing
2: bearing box
2a: oil reserving chamber
2b: oil return pipe
2c: labyrinth
3: bearing cover
3a: labyrinth
3b: space
3c: oil reserving chamber
4: bearing press
5: oil take-up disk
6: oil supply chamber
6a: oil storage chamber:
7: first oil return chamber
8: second oil return chamber
9: oil return hole
10: extension pipe
11: oil thrower plate
12: oil supply hole

DETAILED DESCRIPTION OF THE INVENTION

Figure 2:
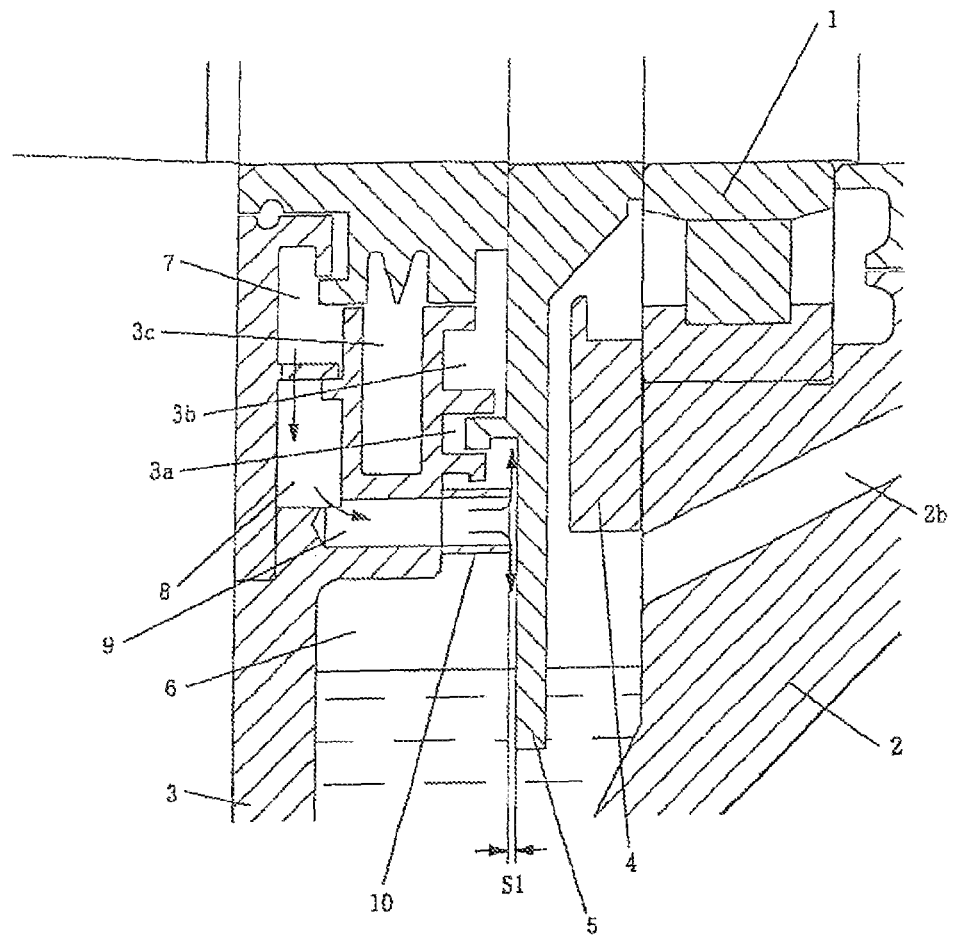
FIG. 2 is a cross sectional view partly enlarged.

Preferred embodiments of the present invention will be described with reference to the accompanying drawings, FIG. 1 is a view in cross section illustrating a bearing device of a main electric motor for vehicle in an embodiment of the present invention, in which although one bearing device of the main electric motor for vehicle is illustrated, the main electric motor for vehicle includes a pair of bearing devices of the same construction. FIG. 2 is a cross sectional view, enlarged in part, illustrating a portion of the present invention. In the same figures, designated at 6 is an oil supply chamber, in a lower portion of which lubricating oil is stored. That portion is called an oil storage chamber 6a. Designated at 5 is an oil take-up disk which is mounted on a rotor shaft 20 and a part of a lower side of which is immersed in oil in the oil storage chamber 6a. As the oil take-up disk 5 is rotated together with the rotor shaft, the oil in the oil storage chamber 6a is taken up and spreads in the oil supply chamber 6.

Designated at 2 is the bearing box on which the bearing 1 is provided by which a rotary shaft 20 is rotatably supported. On the bearing box 2 there is provided an oil reserving chamber 2a for reserving oil lubricating the bearing 1 which is communicated with the oil supply chamber 6 via the oil return pipe 2b. The labyrinth 2c is provided between the rotor shaft 20 and the bearing box 2 to suppress the leakage of the oil into the device through the gap between the rotator shaft 20 and the bearing box 2.

An oil thrower plate 11 is provided above the oil take-up disk 5 and is fixed to the bearing box 2.

Figure 3:
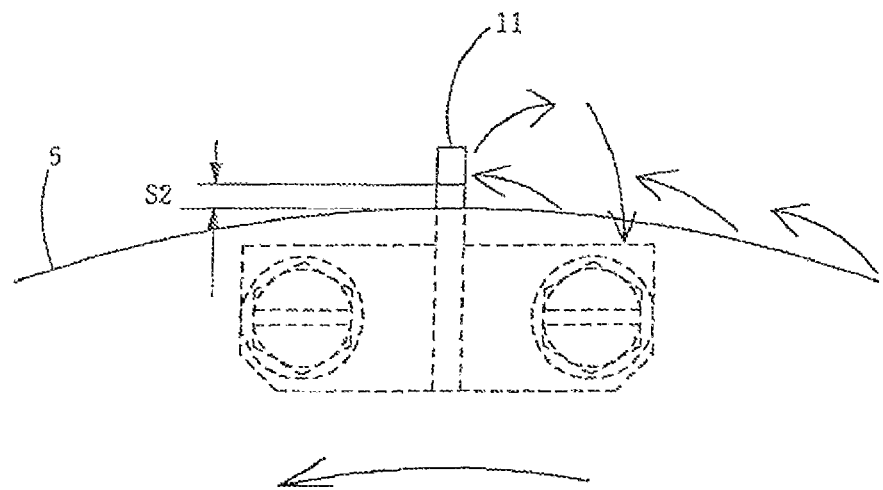
FIG. 3 is a view illustrating an oil take-up disk and an oil thrower plate as viewed in a direction A.

FIG. 3 illustrates the oil take-up disk 5 and the oil thrower plate 11 as viewed from a direction A of FIG. 1 As illustrated in the figure, the oil thrower plate 11 is provided with a fine gap S2 above the oil take-up disk 5 and oil taken up by the oil take-up disk 5 strikes the oil thrower plate 11 and is dammed up thereby and falls down as indicated by an arrow in the same figure. Hereby, the oil taken up can be effectively guided in the direction of the bearing. 1.

Returning to FIG. 1, designated at 4 is an annular bearing press which is mounted on the bearing box 2 for pressing the bearing 1 from the outside thereof such that the bearing 1 does not withdraw from the bearing box 2. The bearing press 4 is annular shaped and disposed to surround the bearing 1, so that the oil taken up is prevented from being supplied to the bearing 1. So, in the present embodiment, an oil supply hole 12 is provided above the bearing press 4 as illustrated in FIG. 1.

Figure 4:
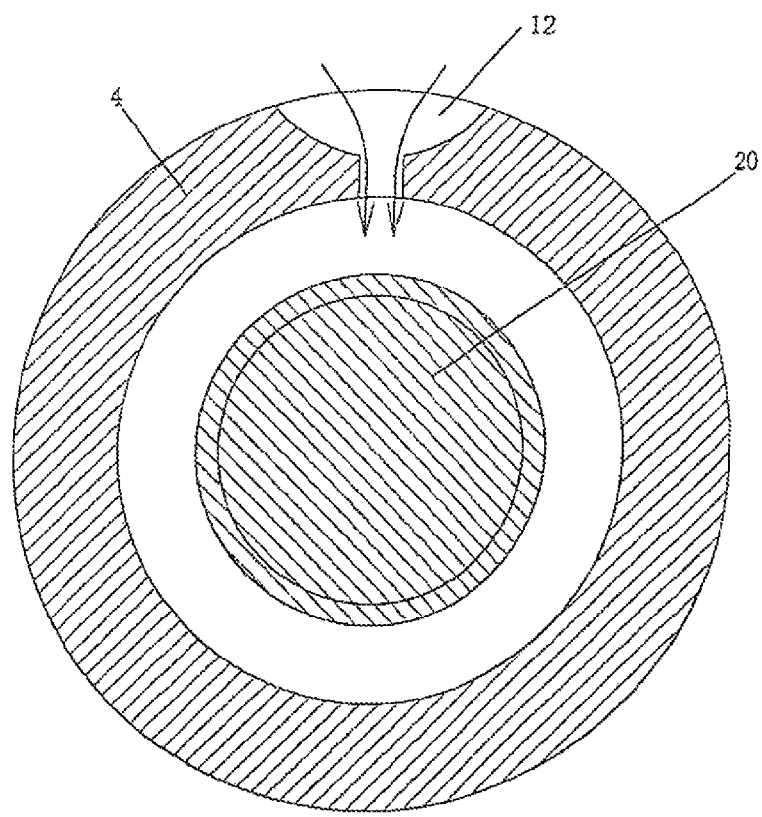
FIG. 4 is a partial cross sectional view (a cross sectional view of FIG. 1 taken along B-B) illustrating a bearing press and an oil supply hole, cut along a flat plane directed perpendicularly to a rotor shaft.

FIG. 4 is a cross sectional view (B-B cross sectional view of FIG. 1) yielded by cutting the bearing press 4 and the oil supply hole 12 by a plane perpendicular to the rotor shaft 20. As illustrated in the same figure, the oil supply hole 12 is provided above the bearing 4, and the oil taken up is guided in the direction of the bearing 1 through the oil supply hole 12.

Returning to FIG. 1, designated at 30 is an outer cover of the electric motor. On the right side of FIG. 1 there are provided a rotor and a stator of the electric motor (not shown in FIG. 1). The outer cover 30 is provided so as to surround the stator and the rotor, and the bearing device illustrated in FIG. 1 is provided at one end of the outer cover 30.

Designated at 3 is a bearing cover which is mounted on the side surface on the outside of the device and which has a hole at the center which the rotor shaft 20 penetrates. The bearing cover 3 is disposed to cover the side surface of the oil supply chamber 6 and the oil supply chamber 6 is formed in a space between the bearing cover 3 and the bearing box 2.

The labyrinth 3a is provided between the bearing cover 3 and the oil take-up disk 5 as illustrated in an enlarged view of FIG. 2 to seal the inside of the oil supply chamber 6 and a space 3b formed on the inner circumferential side of the oil take-up disk 5 and the bearing cover 3.

The annular oil reserving chamber 3c is provided on the inner circumferential side of the bearing cover 3 for storing the oil leaking from the space 3b. Further, there is provided the annular first oil return chamber 7 disposed to surround the rotor shaft 20 in order to reserve the lubricating oil leaking from the oil reserving chamber 3c through a gap formed between the bearing cover 3 and a member rotating together with the rotor shaft 20. Further, on the outer circumferential side of the first oil return chamber 7 there is provided an annular second oil return chamber 8 communicated with the first oil return chamber 7 via a hole.

The first oil return chamber 7 abuts on a member part of which rotates together with the rotor shaft 20, and oil in the chamber 7 is influenced by the rotation of the rotor shaft. So, in the present embodiment, there is provided the second oil return chamber 8 communicated with the first oil return chamber 7 via the hole.

Figure 5:
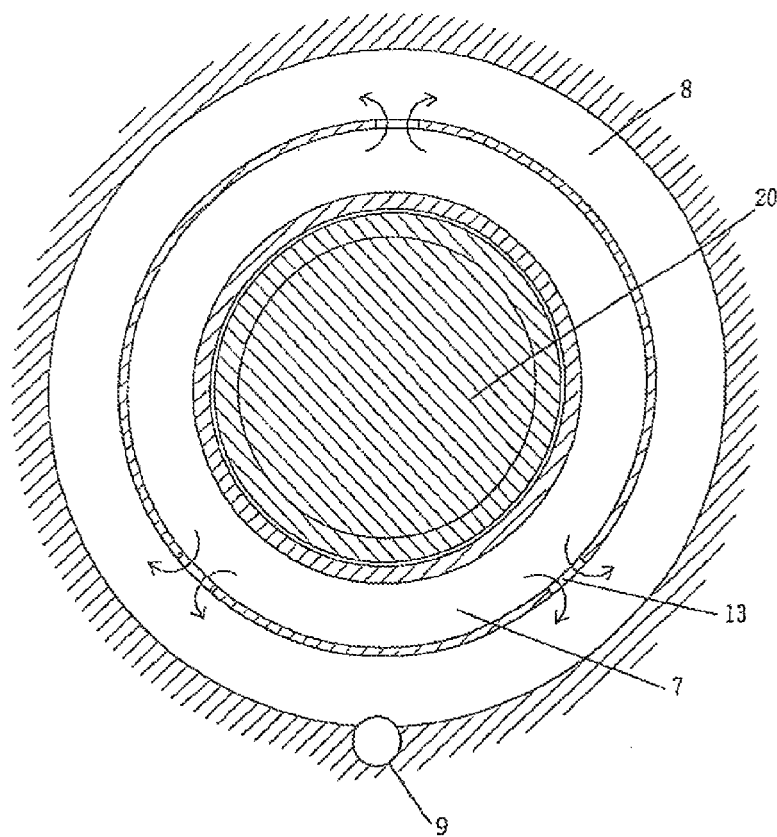
FIG. 5 is a partial cross sectional view illustrating a second oil return chamber, when cut along a flat plane perpendicular to the rotor shaft.

FIG. 5 is a cross sectional view (C-C cross sectional view of FIG. 1) yielded by cutting the first oil return chamber 7 and the second oil return chamber 8 by a plane extending perpendicularly to the rotor shaft 20. As illustrated in the same figure, there is provided a hole 13 at a plurality of locations between the first oil return chamber 7 and the second oil return chamber 8, and as indicated by an arrow in the same figure the oil reserved in the first oil return chamber 7 flows into the second oil return chamber 8 through the hole 13.

Further, as illustrated in an enlarged view of FIG. 2 and FIG. 5, the oil return hole 9 is provided between the oil supply chamber 6 and the second oil return chamber 8, to which an extension pipe 10 attached. The extension pipe 10 extends to the vicinity of the oil take-up disk 5, the opening of which faces the oil take-up disk 5 with a fine gap S1. Hereby, once the oil take-up disk 5 is rotated, negative pressure occurs in the extension pipe 10, causing the oil reserved in the second oil return chamber 8 is sucked by the negative pressure and is guided to the oil supply chamber.

In the following, there will be described a flow of the lubricating oil of the bearing device in the present embodiment with reference to FIG. 6.

Figure 6:
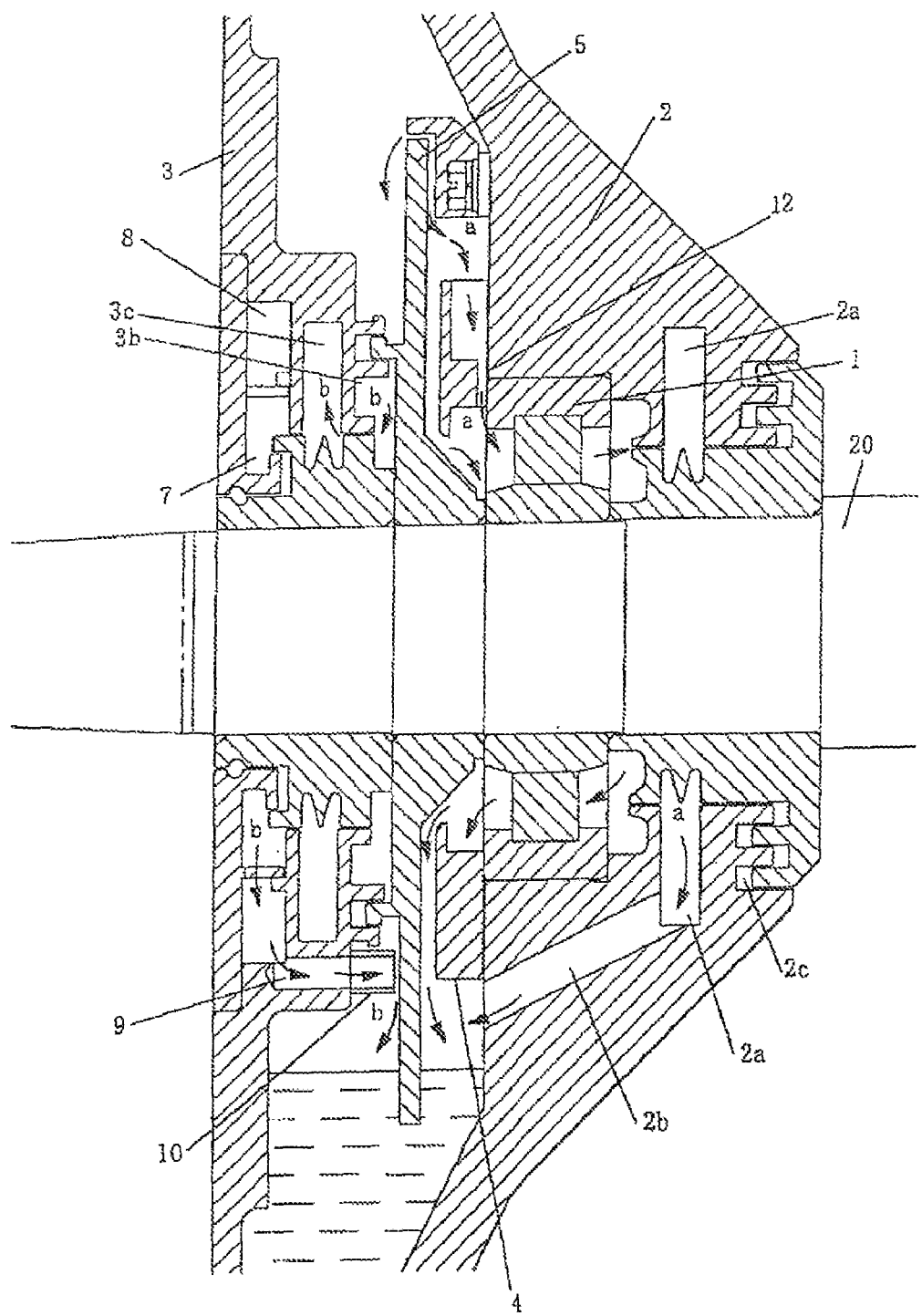
FIG. 6 is a view illustrating a flow of oil for a bearing device of the present invention.

The oil taken up by the oil take-up disk 5 and striking the oil thrower plate 11 and being dammed up thereby passes through the oil supply hole 12 provided in the bearing press 4 and is guided into the bearing 1 as indicated by an arrow (a) of FIG. 6. The oil lubricating the bearing 1 passes through the gap between the rotor shaft 20 and the bearing box 2 and flow into the oil reserving chamber 2a and is further returned to the oil storage chamber 6a through the oil return pipe 2b.

The oil taken up by the oil take-up disk 5 as described above is supplied to the bearing 1, and the oil lubricating the bearing 1 is again returned to the oil storage chamber 6a. In the present embodiment, as described above, the oil thrower plate 11 is provided above the oil take-up disk 5 with a fine gap and the oil supply hole 12 is provided in the bearing press 4, so that the oil taken up can be effectively supplied to the bearing 1.

In contrast, the oil in the space 3b extending between the oil take-up disk 5 and the bearing cover 3 leaks into the oil reserving chamber 3c from the gap between the bearing cover 3 and the rotor shaft 20 as indicated by an arrow (b) in FIG. 6. The oil further flows into the first oil return chamber 7 from the gap between the bearing cover 3 and the rotor shaft 20 and further flows into the second oil return chamber 8 through the hole 13 provided between the first oil return chamber 7 and the second oil return chamber 8.

The second oil return chamber 8 is communicated with the oil supply chamber 6 through the oil return hole 9, the opening of the extension pipe 10 provided in the oil return hole 9 faces the oil take-up disk 5 with a fine gap, and the pressure of the extension pipe 10 is negative, so that the oil stored in the second oil return chamber 8 is sucked into the oil supply chamber 6 owing to the negative pressure. Accordingly, the oil leaking from the gap between the baring cover 3 and the rotor shaft 20 is recovered into the oil storage chamber 6a, suppressing the leakage of the lubricating oil to the outside.

It is therefore possible by employing the bearing device constructed as described above to suppress the leakage of the oil from the main electric motor for vehicle to the outside, keeping the lubricating state of the bearing excellent.

What is claimed is:

1. A bearing structure of an electric motor for a vehicle comprising:
   an oil take-up disk provided in an oil supply chamber having an oil sump at a lower side and rotating together with a rotor shaft, the oil take-up disk taking up lubricating oil stored in the oil sump to supply said lubricating oil into a bearing provided on the rotor shaft for lubrication of said bearing;
   an annular first oil return chamber provided on a bearing cover provided on an apparatus outside side surface for storing lubricating oil leaking through a gap between said bearing cover and said rotor shaft;
   an annular second oil return chamber provided on an outer periphery side of said first oil return chamber and communicated with said first oil return chamber via a hole communicated with said first oil return chamber, said second oil return chamber and said oil supply chamber being communicated with each other via an oil return hole; and
   a pipe extending from said oil return hole to said oil take up disk.

2. The bearing structure of an electric motor for a vehicle according to claim 1 wherein an oil thrower plate is disposed at upper portion of the oil take-up disk with a gap from said disk.

3. The bearing structure of an electric motor for a vehicle according to claim 1 further comprising an annular bearing press for pressing the bearing in a bearing housing, wherein an oil supply hole for guiding the lubricating oil taken up by said oil take-up disk in a bearing direction is provided on an upper side of the annular bearing press provided between the oil supply chamber and the bearing.

4. The bearing structure of an electric motor for a vehicle according to claim 2 further comprising an annular bearing press for pressing the bearing in a bearing housing, wherein an oil supply hole for guiding the lubricating oil taken up by said oil take-up disk in a bearing direction is provided on an upper side of the annular bearing press provided between the oil supply chamber and the bearing.

* * * * *